Oct. 8, 1957  B. R. NEEL  2,809,069
GAMBREL
Filed May 31, 1955

INVENTOR
BUD R. NEEL
BY *Gustave Miller*
ATTORNEY 2,809,069
GAMBREL
Bud R. Neel, San Bruno, Calif.
Application May 31, 1955, Serial No. 512,199
2 Claims. (Cl. 294—79)

This invention relates to gambrels for holding animal carcasses for butchering, and it particularly relates to gambrels of the foldable type.

Gambrels of this type are generally used by hunters and butchers to hold a carcass level while splitting it into two parts and generally consists of a hanger suspended at its center and having a hook at each end. The gambrel acts to hold the two parts of the split carcass in position after the splitting operation takes place.

One of the principal disadvantages of this type of device, as made heretofore, consisted in the fact that after the splitting of the carcass took place, one part of the split carcass invariably being heavier than the other, tended to overbalance the other part, so that it was necessary to hold up and remove the heavier part in order to prevent its falling to the ground. Since the parts of the meat are generally very heavy, it is necessary for two men to take part in the operation so that one can hold up the heavier part of the meat.

It is one object of the present invention to overcome the above and other disadvantages of the heretofore known gambrels by providing a gambrel which will automatically remain balanced in spite of the difference in weight between the two severed parts of the meat.

Another object of the present invention is to provide a gambrel which is light, yet sturdy, and which is adapted to be easily folded into and out of operative position.

Other objects of the present invention are to provide an improved gambrel, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawing in which.

Figure 1:
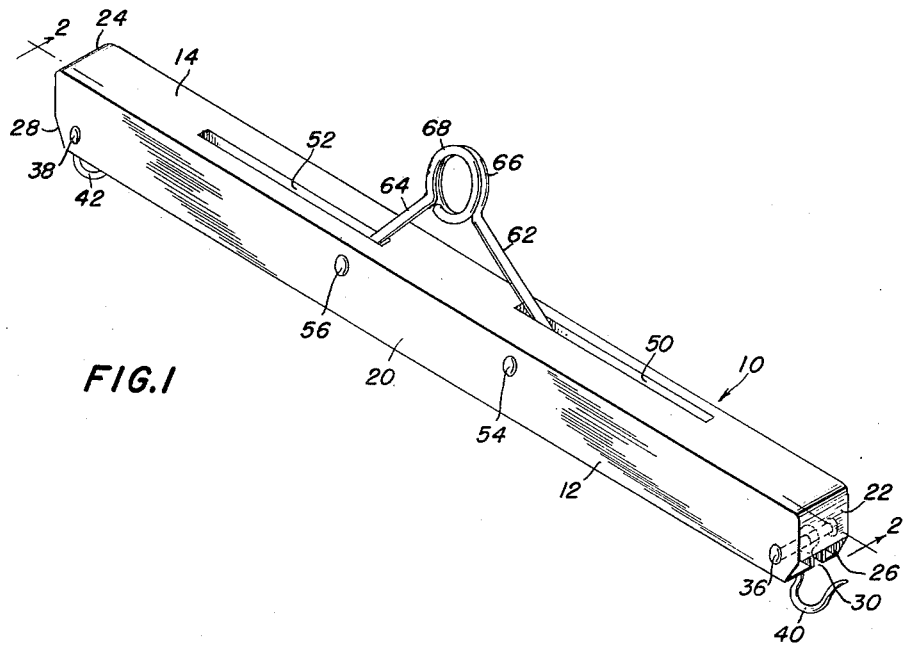
Fig. 1 is a top perspective view of a gambrel embodying the present invention.

Referring now in greater detail to the drawing wherein similar reference characters refer to similar parts, there is shown a gambrel, generally designated 10, comprising an elongated, generally rectangular casing 12 consisting of top and bottom walls 14 and 16, side walls 18 and 20 and end walls 22 and 24. This casing is preferably constructed of a light but sturdy metal such as an aluminum or magnesium alloy. However, it is within the scope of the present invention to use other materials when desired.

Figure 2:
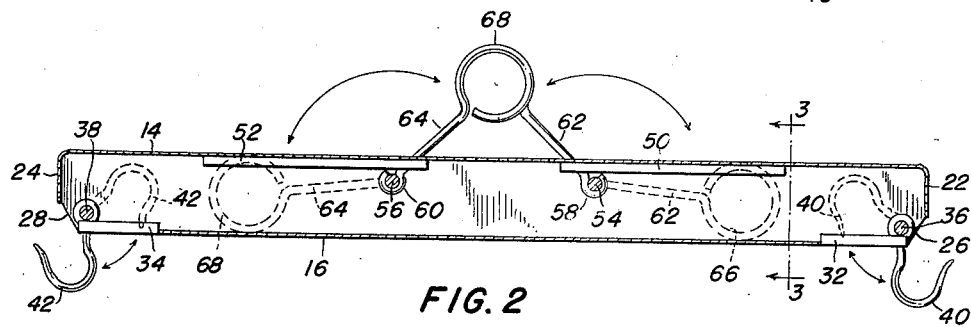
Fig. 2 is a longitudinal sectional view of the device taken on line 2—2 of Fig. 1.
Figure 3:
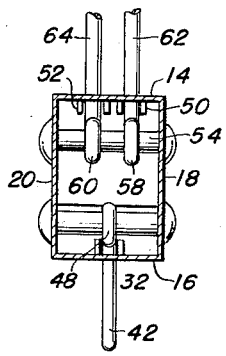
Fig. 3 is a cross-sectional view taken on line 3—3 of Fig. 2.

The end walls 22 and 24 are each provided with an inwardly beveled portion, as at 26 and 28 at the lower sections thereof, and in each of these beveled portions is provided with a slot, one of these slots being shown at 30 in Fig. 1. These slots in the beveled portions intersect horizontal slots at opposite ends of the bottom wall 16, these slots in the bottom wall being shown at 32 and 34 in Fig. 2.

Immediately above each of the slots 32 and 34 and adjacent the beveled portions 26 and 28, within the casing, there is provided a pivot pin or rivet, as at 36 and 38. These pivot pins extend between the side walls 18 and 20 and each pivotally supports a hook, as at 40 and 42. The hooks 40 and 42 are each provided with an eyelet portion, as at 48, and it is these eyelets that form the pivotal connection between the pins 36 and 38 and their corresponding hooks 40 and 42. The hooks 40 and 42, as illustrated, are of partial ogee curvature, and are adapted to pivot on their supporting pins from a folded position within the casing, as indicated in dotted outline in Fig. 2, through the slots 32 or 34, to their operative positions, as indicated in full line in Fig. 2. The hooks 40 and 42 are preferably made of cadmium plated steel; although other materials may be used within the scope of the invention. In the top wall 14 of the casing 10 they are provided a pair of slots 50 and 52. These slots are not only longitudinally spaced from each other but are also laterally offset, as best seen in Fig. 1. Beneath each of these slots, within the casing, there is provided a pivot pin or rivet, as at 54 and 56, these pivot pins extending between the side walls 18 and 20. Pivotally mounted on each of these pivot pins, as by eyelets 58 and 60, is a hanger, as at 62 and 64. Each of these hangers is provided with an enlarged eyelet, as at 66 and 68. These hangers are adapted to pivot through their corresponding slots 50 or 52, from an inoperative position within the casing, as indicated in dotted outline in Fig. 2, to an operative position, as indicated in full line in Fig. 2.

In operation, a carcass is hung on the gambrel between the two hooks 40 and 42, with the hooks piercing the meat from opposite sides thereof. The gambrel is supported at two independent points by means of the hangers 62 and 64. After the carcass is cut into two parts, the heavier part will tend to pull down on its side of the gambrel because of the unbalance of forces. However, when this happens, the hanger at the side of the heavier part of the meat is pulled around on its pivot away from the other hanger so that the distance between the support point of this hanger and its corresponding meat section becomes shorter than the distance between the support point of the other hanger and its corresponding meat section. The torque at the heavier meat section, therefore, becomes less than the torque at the other section. This difference in torque counterbalances the difference in weight. Consequently, the balance between the meat sections will be re-established. Since the pivoting action of the hanger will correspond directly with the difference in the weights of the two meat sections, the re-balancing action will take place automatically.

It should here be noted that, in addition to providing a re-balancing action, the use of two separate hangers provides greater and more balanced support for the original carcass. Consequently, the gambrel may be made of lighter and less expensive materials than would otherwise be the case since the distribution of the weight between the two hangers requires less strength in the construction of the gambrel frame. Furthermore, although it is within the scope of this invention to simply cut out the various slots in the casing, it is preferred that they be stamped out. The reason for the stamping out of the slots is that the metal which remains will add to the inherent strength of the device. In addition, the metal flanges resulting from the stamping provide a snugger fit for the hooks and hangers in their respective slots. This snug fit tends to more easily maintain the hooks and hangers in their folded positions and also prevents rattling. Furthermore, the stamping operation is less expensive than a cutting operation would be.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A gambrel comprising an elongated casing, a hook pivotally mounted adjacent each end of said casing, and a pair of hanger members pivotally mounted in said casing, the pivot points of said hanger members being equally spaced from the center of the casing longitudinally of said casing, and said hanger members being laterally offset from each other to abut side by side to form a common supporting hook when in operative position and to separately pivot back into the casing when in nonoperative position.

2. The device of claim 1 wherein the pivotal connections between said hooks and said casing and between said hanger members and said casing are within the interior of said casing, and wherein the casing has an opening adjacent each said pivotal connection to permit said hooks and said hanger members to pivot from an inoperative position within said casing to an operative position outside said casing.

References Cited in the file of this patent

UNITED STATES PATENTS

| | | |
|---|---|---|
| 1,025,806 | Jarvis | May 7, 1912 |
| 2,592,059 | Nederostek | Apr. 8, 1952 |
| 2,716,571 | Silva | Aug. 30, 1955 |